Feb. 3, 1931.   A. W. KEEN   1,791,060
APPARATUS FOR MANUFACTURING RUBBER ARTICLES
Filed March 13, 1928
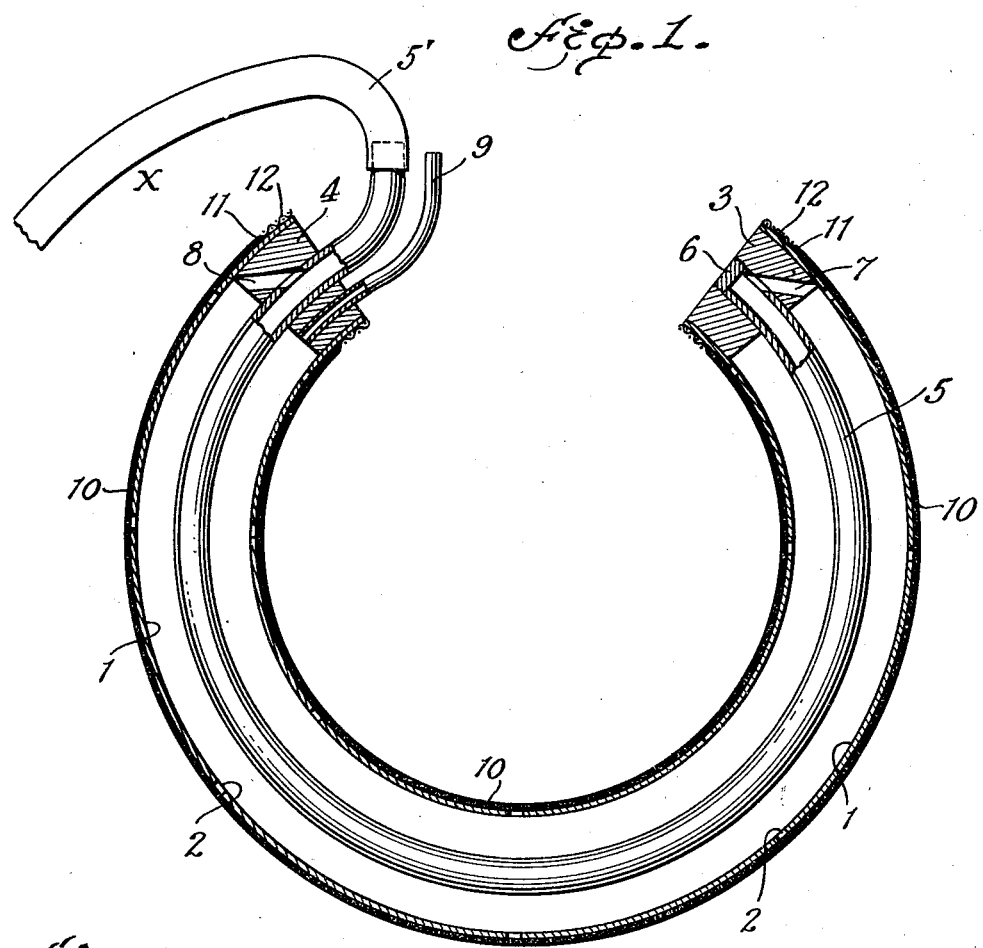
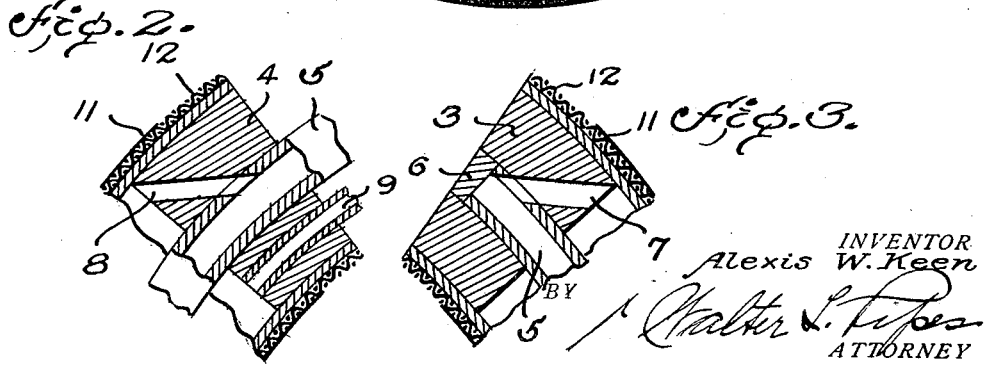
INVENTOR
Alexis W. Keen
BY
ATTORNEY Patented Feb. 3, 1931

1,791,060

UNITED STATES PATENT OFFICE

ALEXIS W. KEEN, OF NEW YORK, N. Y., ASSIGNOR TO MORGAN AND WRIGHT, OF DETROIT, MICHIGAN, A CORPORATION OF MICHIGAN

APPARATUS FOR MANUFACTURING RUBBER ARTICLES

Application filed March 13, 1928. Serial No. 261,222.

This invention relates to a new and improved form for the manufacture of rubber articles directly from latex or equivalent rubber dispersion.

It aims to provide new and improved means for reducing the pressure on the side of the form removed from that to which the latex is applied. It also aims to provide means for facilitating the withdrawal of the aqueous portion or continuous phase of the dispersion. It further aims to enable the reduced pressure to be applied substantially uniformly at any given time throughout the extent of the surface of the form on which the deposit is built up. Other objects and advantages of the invention will appear in connection with the following detailed description thereof.

One of the many possible embodiments of the invention is illustrated in the accompanying drawings, in which latter Figure 1 is a sectional view of the form;

Fig. 2 is an enlarged section of one end of the form; and

Fig. 3 is an enlarged section of the opposite end of the form.

The form shown is a type suitable for manufacturing inner tubes in curved form approximating the curvature of the casing in which they are used, the ends of the deposited rubber tube after drying and vulcanizing being spliced to complete the annulus in any suitable and well-known manner. Of course it is to be understood that the invention may be applied to forms which are straight or otherwise shaped, or it may be applied to a mold type of form on whose interior the rubber is deposited. And it may be applied to complete as well as incomplete annuli in any suitable and convenient manner as for instance by dividing the interior of the same with a dead wall or partition.

Referring to the single embodiment of the invention illustrated in the drawings and with the manufacture of inner tubes in mind, the form comprises a shape retaining support 1 preferably tubular and of metal and light in weight, such as aluminum, the support being preferably provided with a number of channels or apertures 2 whose size and spacing may be anything desired so long as the strength of the support 1 is not impaired. Holes as large as ⅛" in diameter and spaced 2" apart have been found satisfactory, but generally the smaller the holes and the closer the spacing the better. Closure plugs 3 and 4 are inserted in the ends of the support 1 and centrally mounted therein in any suitable and convenient manner is an arcuate hollow tube 5 one end of which is closed as indicated at 6 and the other end of which is connected as indicated at 5' with a source of reduced pressure or evacuating means (not shown). Ports 7 and 8 are provided in the plugs 3 and 4 respectively, the latter 8, being preferably of about 25% less area in cross section than the former. Ports 7 and 8 are of course in communication with the interior of the arcuate tube 5. By constricting the passage 8 relative to passage 7 it is of course possible to apply the vacuum simultaneously to both ends of the hollow support 1 and maintain a more nearly uniform reduced pressure at any one time throughout the interior of the support 1. Preferably but not necessarily, a small vent such as indicated at 9 is provided partly to expedite the removal of the aqueous portion or continuous phase of the dispersion but mainly to enable the vacuum to be more or less continuously applied to the interior of the support 1 (as later will be explained) in removing the aqueous content from the interior of the form 1 after the deposit has been made and the apparatus withdrawn from the latex bath or other means by which the latex may be applied to the form. The vent 9 may be plugged at will and is shown mounted in plug 4 but obviously it may be mounted in either of the plugs or be made an adjunct to the arcuate tube 5 without its port or passage, however, being in communication with the bore of the tube 5.

The apertured support 1 is provided on its surface remote from the arcuate tube 5 with a filtering stratum indicated at 10 which may be of any suitable construction which will permit the aqueous portion or continuous phase of the dispersion to be withdrawn and the rubber or dispersed phase to be built up or accumulated by deposition with or without a simultaneous electrophoretic action. A wide variety of constructions and materials may be used for the filtering stratum or layer 10, and among the possible constructions are the following: A wrapping of relatively finely woven fabric—the same surfaced or coated with a clay slip or any finely divided material which will adhere to the fabric and yield after coating a surface permeable to the aqueous portion of the latex—a permanent filtering composition such as diatomaceous earth, or celite, and a heat hardenable binder therefor such as bakelite, with or without a superimposed coating of the above mentioned clay slip or its equivalent—and of the above combination with one or more wrappings of wire intermediate the support 1 and the exposed face of the filtering layer—and also successive layers of wire and fabric externally coated with a filtering composition of clay slip etc. to afford a medium for deposition which is relatively smooth and permeable only to the aqueous portion or continuous phase of the dispersion. The construction and materials of the filtering layer or surface 10 specifically form no part of the present invention and all of the many possible constructions and materials which may constitute the same are comprehended in the board aspects of this invention. The filtering stratum or layer 10 is preferably terminated a short distance from the ends of the form as indicated at 11, and sealed off in any suitable manner, as, for instance, by wrappings of rubberized fabric 12 to compel the aqueous portion of the latex to be withdrawn entirely through the surface of the filtering layer and to eliminate the needless formation of a flange of rubber.

The rubber latex or other dispersion may be applied to the form of the present invention in any suitable manner. Preferably the form in a more or less vertical plane is immersed in a vat of latex, being supported as convenient by seizure of the projecting end of the tube 5 or any suitable attachment to one of its ends. After or before the latter preferably, immersion of the form in the latex, the vacuum is applied through the line 5' to the hollow tube 5. While any suitable reduced pressure may be employed, it has been found that a differential of around 5 or 6 lbs. during the depositing operation gives satisfactory results, the rate of deposit approaching the maximum at such reduced pressure. When the desired thickness of deposit has accumulated on the surface 10, the form is withdrawn from the latex preferably in such a manner as to allow excess latex to flow to the ends of the form and prevent channeling of the deposit. Most easily this can be accomplished by rotation of the form in a vertical plane about some such point as indicated at X in the drawing until the plugged ends 3 and 4 of the form are lowermost. At this time the interior of the form will contain a quantity of the aqueous portion of the latex, more being adjacent the plug 3 than is adjacent the plug 4, at least when the removal of the form from the latex has taken place as above described. Of course the form may be manipulated so as to gather or collect the aqueous content therewithin adjacent the end in which the vent 9 is provided. However the form may be manipulated, it is desirable to expeditiously remove the aqueous portion and to this end the vacuum being still applied to the arcuate tube 5, the aqueous portion will be drawn off through the ports 7 and 8. Such withdrawal of the aqueous portion will continue until an equilibrium is reached if the vent 9 be, as it may, plugged, but on opening the vent 9 air at atmospheric pressure will enter slowly through the small bore of the vent and thus always permit of the maintenance of a differential of pressure between the interior of the form and the vacuum line 5'. In this way the aqueous portion may be more or less continuously removed from the interior of the form. If it happens that some of the aqueous portion of the latex remains in the form, and assuming the vent 9 to be closed, it is always possible to resume removal of the aqueous portion within the form by breaking the vacuum line through a suitable valve so as to bring the pressure within the interior of the form back to a point slightly short of atmospheric and then reapply the vacuum to effect withdrawal of such remaining aqueous portion.

While not considered desirable or necessary for most operations, it is of course possible to connect the line 5' through suitable valves with a source of supply of air or steam at relatively small pressures above that of the atmosphere and to utilize the arcuate tube 5 and vent 9 as a means of circulating such air or low pressure steam through the form in order to facilitate drying of the deposit of rubber from the interior outward. Of course after the deposit of rubber has been built up upon the surface 10 there is some water in it which has to be removed by drying, and this drying may be accomplished in any suitable and convenient manner as by introduction of the form into a drying oven or in a room maintained at a suitable drying temperature. Temperatures as high as 300° F. may be employed in the drying operation and simultaneously if desired drying may be effected from the interior of the form. It is advisable to stop the drying operation slightly before all of the water has been removed and before vulcanization of the deposit commences, the latex from which the deposit has been made of course having been suitably compounded to meet the requirements of the inner tube to be made. The vulcanizing operation which follows drying may be carried on in any suitable or convenient manner, preferably under pressure in steam or gas, suitable precautions being taken to prevent blowing. Finally the tube is stripped from the form off the free end thereof (ballooning if desired) and then spliced with or without a skiving of its ends, as the manufacture may desire.

In the foregoing the invention has been described with particular reference to the illustrated embodiment thereof, but obviously the shape of the form may be varied to suit the article which is to be made. Also the invention may be applied to an external form, i. e. one on which the deposit is built up on the inner surface rather than externally as in the type of form illustrated. While the invention has been described as utilizing less than atmospheric pressure, for facilitating the deposition of the rubber from the latex on to the form and for facilitating the removal of the aqueous portion from the interior of the form, it is to be clearly understood that the same results may be achieved by effecting a differential of pressure in any way so long as the pressure on the latex or dispersion is greater than the pressure on the surface of the form opposite that in contact with the latex. Obviously a super-atmospheric pressure may be applied to the latex and a lesser pressure maintained on the line 5'. Therefore in the claims means for reducing pressure or evacuating means or equivalent expressions are to be interpreted as comprehending any means of producing the disclosed differential-pressure. Various other changes and alterations may be made and all such as are within the principles underlying the invention are intended to be comprehended in the scope of the accompanying claims, to which reference is made.

Having thus described my invention, what I claim and desire to protect by Letters Patent is:

1. An apparatus for manufacturing rubber articles comprising a form upon which material may be deposited from a dispersion by withdrawal of its continuous phase in combination with means for reducing pressure on the side of the form opposite to that upon which the deposit is made, said means including a conduit adapted to be placed in communication with an external evacuating means, and said form being provided with passages in communication with the side thereof opposite to that upon which the deposit is made and with the conduit at spaced intervals, and means for venting the side of the form opposite that upon which the deposit is made.

2. An apparatus for manufacturing rubber articles comprising a completely closed hollow form upon which rubber may be deposited from latex by withdrawal of its aqueous portion, in combination with means for evacuating the interior of the form, and means for venting the interior of the form.

3. An apparatus for manufacturing rubber articles comprising a completely closed hollow form upon which rubber may be deposited from latex by withdrawal of its aqueous portion, in combination with means for evacuating the interior of the form including a conduit, and passages of different cross section in communication with the interior of the form and with the conduit.

4. An apparatus for manufacturing rubber articles comprising a completely closed hollow form upon which rubber may be deposited from latex by withdrawal of its aqueous portion, in combination with means for evacuating the interior of the form including a conduit, and passages of different cross section in communication with the interior of the form and with the conduit, and means for venting the interior of the form.

5. An apparatus for manufacturing inner tubes comprising a hollow tubular form upon which rubber may be deposited from latex by withdrawal of its aqueous portion to the interior thereof, said tubular form being closed at its opposite ends, in combination with means for maintaining less than atmospheric pressure on the interior of the form and substantially uniform throughout said interior at any given time.

6. An apparatus for manufacturing inner tubes comprising a hollow tubular form upon which rubber may be deposited from latex by withdrawal of its aqueous portion to the interior thereof, said tubular form being closed at its opposite ends, in combination with means for evacuating the interior of the form, and means for venting the interior of the form.

7. An apparatus for manufacturing inner tubes comprising a hollow tubular form upon which rubber may be deposited from latex by withdrawal of its aqueous portion to the interior thereof, said tubular form being closed at its opposite ends, in combination with means for evacuating the interior of the form including a conduit adapted to be connected to a source of low pressure and extending internally of the form, and passages of different area in cross section establishing communication between the interior of the form and the conduit.

8. An apparatus for manufacturing inner tubes comprising a hollow tubular form upon which rubber may be deposited from latex by withdrawal of its aqueous portion to the interior thereof, said tubular form being closed at its opposite ends, in combination with means for evacuating the interior of the tubular form including a conduit mounted in the closed ends of the form and approximately coextensive therewith, and passages of different area in cross section in communication with the interior of the form and with the conduit, and means independent of the conduit for venting the interior of the form.

Signed at New York, county and State of New York, this 10th day of March, 1928.

ALEXIS W. KEEN.